United States Patent [19]

Greenberg

[11] Patent Number: 4,515,390
[45] Date of Patent: May 7, 1985

[54] CHASSIS AND SUSPENSION SYSTEM FOR VEHICLES

[76] Inventor: William H. Greenberg, 23 Sylvia La., Lincoln, R.I. 02865

[21] Appl. No.: 483,910

[22] Filed: Apr. 11, 1983

[51] Int. Cl.³ .............................................. B60G 21/00
[52] U.S. Cl. .................... 280/675; 180/903; 267/36 A; 280/112 A; 280/772
[58] Field of Search ................ 280/95 R, 104, 112 R, 280/112 A, 675, 772; 180/903; 296/15; 267/36 A

[56] References Cited

U.S. PATENT DOCUMENTS

| | | | |
|---|---|---|---|
| 2,260,102 | 10/1941 | Fréret | 280/112 A |
| 2,791,440 | 5/1957 | Guidobaldi | 280/112 A |
| 3,150,882 | 9/1964 | Corbin | 280/666 |
| 3,170,682 | 2/1965 | Eggers | 280/112 R |
| 3,408,088 | 10/1968 | Corbin | 280/666 |
| 3,479,050 | 11/1969 | Bloise | 280/112 R |
| 3,485,506 | 12/1969 | Melbar et al. | 280/112 A |
| 3,729,210 | 4/1973 | Cunningham, Jr. | 280/112 R |
| 3,831,965 | 8/1974 | Dickens | 280/112 A |

FOREIGN PATENT DOCUMENTS

| | | | |
|---|---|---|---|
| 22471 | 7/1921 | France | 267/36 A |
| 1108823 | 1/1956 | France | 280/112 A |

Primary Examiner—Joseph F. Peters, Jr.
Assistant Examiner—Kenneth R. Rice
Attorney, Agent, or Firm—Salter & Michaelson

[57] ABSTRACT

A chassis and suspension system includes a chassis which is pivotally suspended from front and rear subchassis, and front and rear interchassis springs which resiliently restrict the pivotal movement of the chassis relative to the front and rear subchassis, respectively. Front and rear wheel connecting assemblies mount front and rear wheels, respectively, on the front and rear subchassis, respectively, so that they are independently resiliently upwardly movable in substantially parallel relation to the central vertical axes of the respective subchassis. By properly dimensioning the components of the chassis and suspension system, it functions so that during cornering, only the chassis rotates while the front and rear subchassis remain in substantially unrotated dispositions, whereby the wheels remain substantially perpendicular to a roadway surface therebeneath to maximize tire adhesion.

16 Claims, 10 Drawing Figures

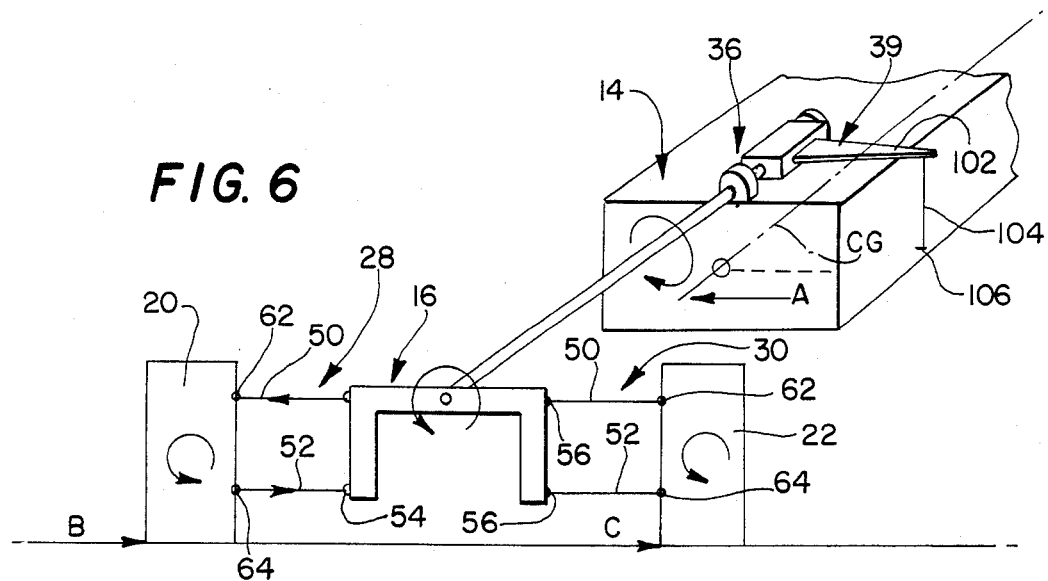
FIG. 6
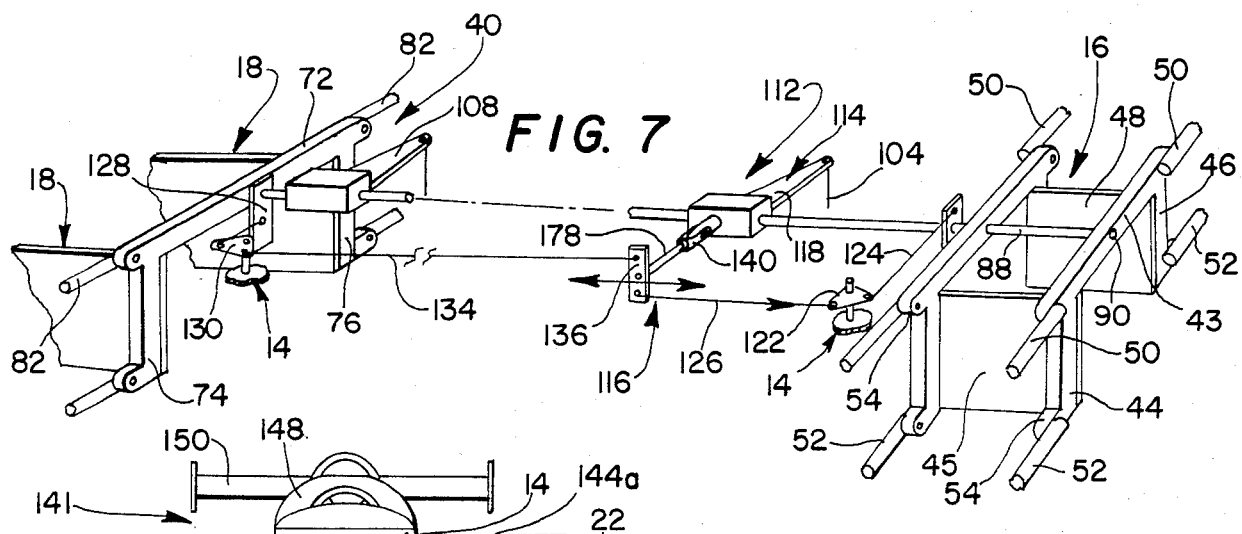
FIG. 7
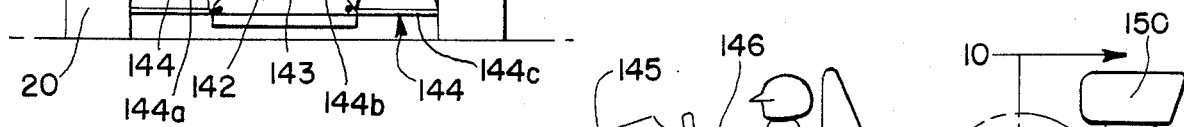
FIG. 8
FIG. 9
FIG. 10
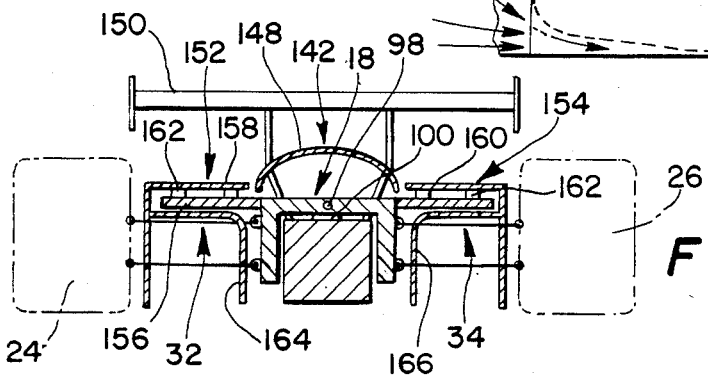

CHASSIS AND SUSPENSION SYSTEM FOR VEHICLES

BACKGROUND AND SUMMARY OF THE INVENTION

The instant invention relates to motorized vehicles and more particularly to a novel chassis and suspension system which provides optimal high speed handling characteristics in a motorized vehicle, particularly a racing type vehicle.

A wide variety of suspension systems have heretofore been available and have been adapted to achieve various handling characteristics in different types of vehicles. However, virtually all of the heretofore known suspension systems have involved certain design compromises, wherein certain handling and/or ride characteristics have been sacrificed in order to achieve certain other characteristics which have been considered more important for the particular vehicle. For example, many of the typical passenger vehicles currently in use are designed for economy and smooth ride but handle relatively poorly in high speed cornering situations. Some of the more expensive specialty passenger vehicles utilize more sophisticated and expensive suspension systems to achieve improved handling characteristics but even these systems are generally deficient in one or more areas. Typical racing vehicles frequently utilize independent suspension systems comprising independent A-arms or wishbone-arms and extremely stiff springs to achieve improved handling characteristics but they generally provide extremely harsh ride characteristics which can result in driver fatigue.

One factor which has proven to be of primary importance in achieving good handling characteristics in a vehicle under high speed cornering situations is the tire adhesion of the vehicle which is directly related to the resistance of the vehicle to lateral slip during cornering. In this connection, the tire adhesion of a vehicle depends both on the design of the vehicle tires per se and on the design of the vehicle, particularly the suspension system thereof. It has been found that the contact area between the tires of a vehicle and the road surface, commonly referred to as the contact patch area, is of particular significance and should generally be maximized in order to maximize the tire adhesion of the vehicle during cornering situations. Specifically, this is because when the contact patch area of a tire is increased, there is a greater tire area to absorb the centripetal forces acting thereon during cornering situations and hence, the tire is deformed to a lesser degree. As a result, the tire can absorb greater lateral or centripetal forces before it is deformed to the point where it looses adhesion.

The size of the contact patch area of a tire during cornering is influenced both by the size and quality of the tire as well as by the handling characteristics of the vehicle on which it is mounted. Substantial improvements have been realized in recent years in tire design and have resulted in improved tire adhesion characteristics for virtually all high speed vehicles. With regard to vehicle design, it has been found that it is advantageous to maintain the wheels and tires of a vehicle in substantially perpendicular relation to a roadway surface at all times, and particularly during cornering of the vehicle, to maximize contact patch area and thereby achieve optimum tire adhesion. In this connection, the degree of wheel or tire camber, which is the degree of deviation of the wheel or tire from perpendicular relation to a roadway surface is, therefore, a primary concern in the design of a high speed vehicle. Specifically, wheel or tire camber should be maintained at nearly zero in order to maximize tire contact patch area and hence tire adhesion. For example, it has been found that an increase in the camber of the wheels or tires of a vehicle by as little as one half of a degree can drastically reduce the overall contact patch area of the vehicle tires and thereby significantly reduce the ability of the vehicle to resist "spinout". However, while the benefits of maintaining the wheels of a vehicle in zero camber dispositions have been recognized, the heretofore available suspension systems have not been able to effectively achieve this.

Another important consideration in the design of a high speed vehicle is the ability of the vehicle to encounter bumps without causing the tires of the vehicle to lose roadway adhesion. Most high speed vehicles utilize independent suspension systems wherein the individual wheels of the vehicle are independently suspended and yield independently when bumps are encountered. Independent springs and dampers are provided to dampen the uplift effects on the individual wheels.

It has also been found to be desirable to minimize the "unsprung weight" of a vehicle to enhance the ability of the vehicle to absorb pumps. In this regard, the term, "unsprung weight", relates to the portions of a vehicle, such as the wheels and tires thereof, which normally yield upwardly when bumps are encountered, as opposed to the chassis, engine, driver, fuel, water, etc. which comprise the "sprung weight" of the vehicle and which remain substantially stationary under such conditions. The ratio between the "unsprung weight" and the "sprung weight" of a vehicle has proven to be a useful parameter in determining proper spring and dampening rates in vehicle suspension designs. In this regard, the "unsprung weight" of a vehicle is directly related to the amount of upward momentum which is imparted to the vehicle when a bump is encountered. Therefore, by minimizing the "unsprung weight" of the vehicle, the momentum imparted thereto by a pump can be minimized to minimize the effect of the bump.

The instant invention provides a novel independent suspension system, wherein the wheels of a vehicle are maintained in substantially zero camber dispositions under virtually all conditions. Accordingly, the vehicle wheels are maintained substantially perpendicular to a roadway surface therebeneath even under severe cornering conditions, so that overall contact patch area of the vehicle is maximized. The suspension system of the instant invention is also suited for light "unsprung weight" designs to minimize the momentum imparted to the wheels of a vehicle when bumps are encountered. When embodied in a high speed racing type vehicle, the chassis and suspension system can be constructed with substantially softer springs than currently used in conventional racing vehicles so that driver fatigue can be minimized. In addition, because the unique chassis and suspension system of the instant invention maintains the wheels of a vehicle in substantially zero camber dispositions, the suspension system is particularly adapted for use in combination with aerodynamic venturi ducts which draw a vehicle downwardly to increase the downward forces on the tires thereof to thereby further enhance the tire adhesion characteristics. Specifically, the suspension system of the instant invention includes front and rear subchassis which are maintained in substantially level dispositions at all times. As a result, by mounting the venturi ducts on the front and rear subchassis, the ducts also remain level under all conditions, including cornering conditions. Consequently, the venturi ducts of the vehicle can be mounted so that they are maintained in relatively closely spaced relation to a roadway surface without engaging same as a result of swaying during cornering.

The chassis and suspension system of the instant invention comprises a chassis, a front subchassis, a rear subchassis, right and left front wheels, and right and left rear wheels. Front connecting means rotatably mount the right and left front wheels so that they are resiliently upwardly movable on the right and left sides of the front subchassis, respectively, for supporting same on a supporting surface, the front wheels being pivotable to effect steering of the vehicle, and rear connecting means rotatably mount the right and left rear wheels so that they are resiliently upwardly movable on the right and left sides of the rear subchassis, respectively, for supporting the rear subchassis on the supporting surface. Means are also provided for pivotally suspending the front and rear portions of the chassis from the front and rear subchassis, respectively, so that the chassis is pivotable about a substantially longitudinal axis in the vehicle which is above the longitudinal center of gravity axis of the chassis, and means are provided for independently resiliently interconnecting the front and rear portions of the chassis to the front and rear subchassis, respectively, to resiliently restrict the pivotal movement of the chassis relative to the front and rear subchassis.

As a result of the pivotal interconnection between the chassis and the front and rear subchassis, when a vehicle embodying the chassis and suspension system of the instant invention moves in an arcuate path on a supporting surface, equal and opposite moments are applied by the chassis and the two subchassis about the pivot axis. The moment applied by the chassis can be computed from the vertical distance between the longitudinal center of gravity axis of the chassis and the pivot axis and the centrifugal forces on the chassis as they are applied along the longitudinal chassis center of gravity axis. The moments applied by the two subchassis can be computed from the centripetal forces applied to the subchassis by the roadway surface as translated through the wheels and the suspension arms, and the heights of the axles, the heights of suspension arms, and the height of the pivot axis. Because the chassis is pivotable about the pivot axis, when equilibrium conditions are reached during vehicle cornering, the chassis will normally be pivoted to a certain degree relative to the subchassis, and the chassis and/or the subchassis will also be pivoted relative to the roadway surface. However, by properly dimensioning the chassis, the wheels, and the two subchassis, by properly adjusting the positions of the suspension arms, and by selecting the proper resiliency for the means resiliently interconnecting the two subchassis to the chassis as by using trial and error techniques and/or known mathematical calculation techniques, it is possible to "tune" the chassis and suspension system of the instant invention so that when equilibrium conditions are reached during cornering, only the chassis assumes a rotated disposition relative to the roadway surface and the two subchassis remain in substantially unrotated dispositions. As a result, since the wheels of the system are connected to the two subchassis rather than the chassis, for the first time it is possible to design a vehicle wherein the wheels thereof remain in substantially zero camber dispositions under cornering conditions to maximize tire adhesion. Further, by mounting venturi ducts on the front and rear subchassis, the venturi ducts also remain level and do not sway during cornering, so that the ducts can be mounted closer to the roadway surface to provide greater efficiency without risk of engaging the roadway.

The closest prior art to the instant invention of which the applicant is aware is disclosed in the U.S. patents to Dickens, U.S. Pat. No. 3,831,965, Cunningham, Jr., U.S. Pat. No. 3,729,210, Melbar et al., U.S. Pat. No. 3,485,506, Bloise, U.S. Pat. No. 3,479,050, Corbin, U.S. Pat. Nos. 3,408,088 and 3,150,882, Guidobaldi, U.S. Pat. No. 2,791,440, and Freret, U.S. Pat. No. 2,260,102. However, while some of these references do teach chassis and suspensions wherein portions of the systems pivot about longitudinal axes in their respective vehicles, they do not teach a system wherein a chassis is resiliently pivotable about a longitudinal axis relative to front and rear subchassis and wherein the wheels of the system are independently movable. Hence, it is felt that all of the cited references are really of nothing more than general interest.

Accordingly, it is a primary object of the instant invention to provide a chassis and suspension system for a vehicle, whereby the wheels of the vehicle can be maintained in substantially perpendicular relation to a roadway surface during cornering conditions.

Another object of the instant invention is to provide a chassis and suspension system which provides enhanced vehicle handling under cornering conditions.

A further object of the instant invention is to provide a vehicle suspension system having a chassis and front and rear subchassis wherein the chassis is pivotally suspended from the front and rear subchassis and pivots about a substantially longitudinal axis which is above the longitudinal center of the gravity axis of the chassis.

A still further object of the instant invention is to provide a chassis and suspension system for a high speed vehicle wherein venturi ducts may be maintained in more closely spaced relation to a roadway surface without engaging same during cornering conditions.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 6 is a schematic perspective view of the front portion of the chassis and suspension system;

FIG. 7 is a fragmentary perspective view of an alternate embodiment of the chassis and suspension system which includes a linkage assembly for coordinating the movement of the front and rear subchassis;

FIG. 8 is a front elevational view of another alternate embodiment of the chassis and suspension system;

FIG. 9 is a fragmentary side elevational view of a vehicle embodying the chassis and suspension system of the instant invention as illustrated in FIGS. 1-5; and FIG. 10 is a sectional view taken along line 10—10 in FIG. 9.

DESCRIPTION OF THE INVENTION

Figure 5:
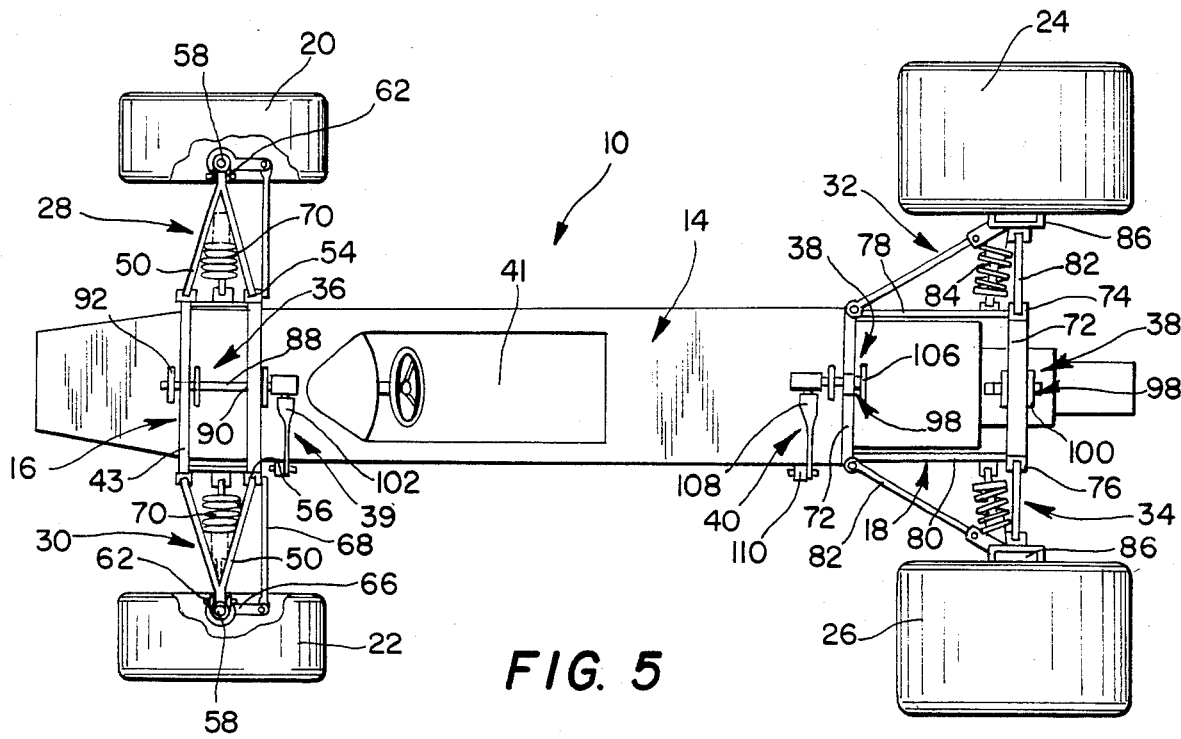
FIG. 5 is a top plan view of the chassis and suspension system.

Referring now to the drawings, the chassis and suspension system of the instant invention is illustrated and generally indicated at 10 in FIG. 5. The chassis and suspension system 10 is particularly adapted for use in a high speed vehicle of the type illustrated in FIGS. 1 and 2 and generally indicated at 12 in FIG. 1, and is operative to provide optimal handling characteristics in the vehicle 12 during the cornering thereof.

Referring to FIGS. 3-7, the chassis and suspension system 10 comprises a chassis generally indicated at 14, a front subchassis generally indicated at 16, a rear subchassis generally indicated at 18, right and left front wheels 20 and 22, respectively, and right and left rear wheels 24 and 26, respectively. The right and left front wheels 20 and 22, respectively, are mounted on the front subchassis 16 with right and left front wheel connecting assemblies 28 and 30, respectively, and the right and left rear wheels 24 and 26 are mounted on the rear subchassis 18 with right and left rear wheel connecting assemblies 32 and 34, respectively. The chassis and suspension system 10 further comprises front and rear pivotal mounting assemblies 36 and 38, respectively, which pivotally suspend the chassis 14 fron the front and rear subchassis 16 and 18, respectively, so that it is pivotable about a substantially longitudinal axis which is above the longitudinal center of gravity axis of the chassis 14, and front and rear interchassis spring assemblies 39 and 40, respectively, which independently resiliently restrict the pivotable movement of the chassis 14 relative to the subchassis 16 and 18. The chassis 14, the subchassis 16 and 18, the front connecting assemblies 28 and 30, the rear connecting assemblies 32 and 34, and the front and rear interchassis spring assemblies 39 and 40, respectively, are preferably dimensioned and configured so that when the chassis and suspension system 10 is advanced on a roadway surface and is exposed to lateral cornering forces, the chassis 14 rotates or pivots relative to the subchassis 16 and 18 while the subchassis 16 and 18 remain in substantially unrotated dispositions. Accordingly, the wheels 20, 22, 24 and 26 are maintained in substantially zero camber dispositions at all times, whereby the contact patch areas of the wheels 20, 22, 24 and 26 are maximized to achieve optimum roadway adhesion.

The chassis 14 comprises the main longitudinal structural element of the system 10 and includes a cockpit area 41. Substantially all of the drive components necessary for the propulsion of the vehicle 12 such as an engine 42 illustrated in FIG. 1, and a fuel tank (not shown) are normally mounted in the chassis 14. For simplicity, the outer configuration of the chassis 14, as herein illustrated, is substantially rectangular although it will be understood that the chassis 14 can be embodied in various configurations as dictated by the particular application.

Figure 3:
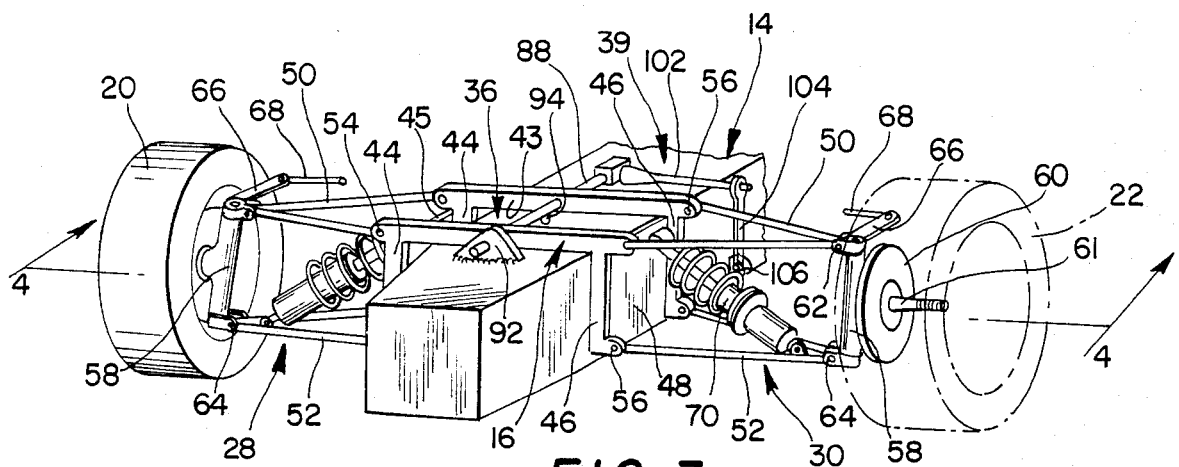
FIG. 3 is a fragmentary perspective view of the front portion of the chassis and suspension system of the instant invention per se.
Figure 4:
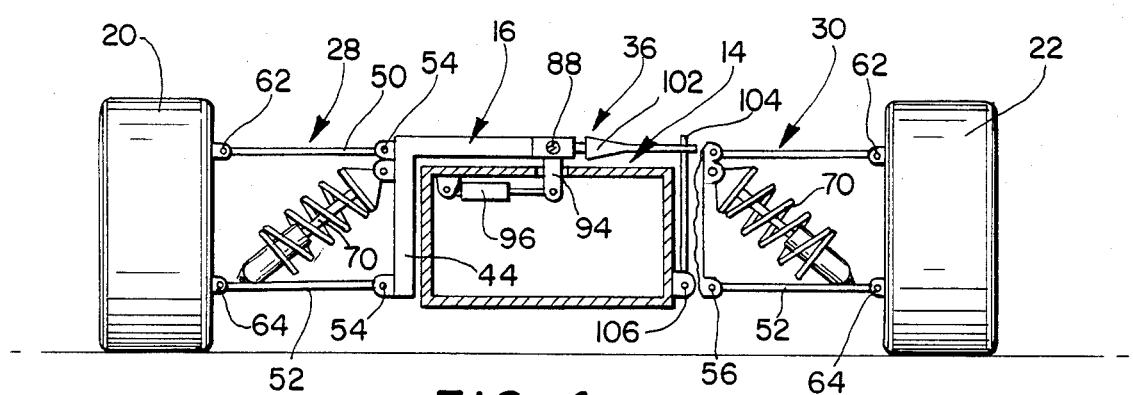
FIG. 4 is a sectional view taken along line 4—4 in FIG. 3.

Referring now to FIGS. 3 and 4, the front subchassis 16 and the right and left front connecting assemblies 28 and 30, respectively, are more clearly illustrated. As will be seen, the front subchassis 16 comprises a pair of transverse members 43, a pair of right vertical members 44 which extend downwardly front the members 43 and are interconnected by a right side plate 45, and a pair of left vertical members 46 which extend downwardly from the members 43 and are interconnected by a left side plate 48. Accordingly, the front subchassis 16 defines a rigid frame-like structure in the front portion of the chassis and suspension system 10. The front subchassis 16 is, however, formed so that it is of greater dimension than the adjacent portion of the main chassis 14, whereby it is positionable in outwardly spaced relation thereto, so that clearance is provided to allow relative rotation between the chassis 14 and the subchassis 16. It will be understood, in this regard, that other embodiments of the instant invention are contemplated wherein greater amounts of clearance between the chassis 14 and the subchassis 16 are provided than herein illustrated to allow greater degrees of relative rotation therebetween. The connecting assemblies 28 and 30 are preferably of light weight construction to provide a light "unsprung weight" in the system 10 and comprise pairs of vertically spaced, substantially parallel upper and lower A-arms 50 and 52, respectively, of substantially equal lengths which are pivotally attached in spaced relation at the bases thereof to the members 44 and 46 on the opposite sides of the subchassis 16 as at 54 and 56, respectively. As illustrated in FIG. 3, pivotally attached to the apices of the pairs of A-arms 50 and 52 are king pins 58 having hub assemblies 60 attached thereto, the hub assemblies 60 including conventional braking elements (not shown) and substantially horizontally extending axles 61 on which the wheels 20 and 22 are mounted. In this connection, the A-arms 50 and 52 are pivotally attached to the respective king pins 58 as at 62 and 64, respectively, so that the king pins 58 are upwardly movable relative to the subchassis 16. Accordingly, since the pairs of A-arms 50 and 52 are substantially parallel and of substantially equal lengths, when the king pins 58 are moved upwardly through the pivotal movement of the respective A-arms 50 and 52, the axles 61 remain substantially parallel to a roadway surface therebeneath as long as the chassis 16 remains in an unrotated disposition. As a result, the wheels 20 and 22 are maintained in substantially zero camber dispositions as long as the chassis 16 remains in an unrotated disposition. In this condition, the wheels 20 and 22 are maintained in substantially zero camber dispositions but they are pivotable relative to the axes of the king pins 58 to effect steering of the system 10. Hence, actually the wheels 20 and 22 are maintained parallel to the central vertical axis of the subchassis 16. Also attached to the king pins 58 are steering arms 66 which are connected to steering linkage 68 to effect steering of the wheels 20 and 22 in a conventional manner. Spring and damper assemblies 70, which may be somewhat "softer" than the spring assemblies frequently used in conventional racing vehicles, extend between the lower A-arms 52 and the subchassis 16 to provide conventional resilient damping of the movement of the wheels 20 and 22 relative to the subchassis 16.

The rear subchassis 18 and the right and left rear wheel connecting assemblies 32 and 34, respectively, are illustrated in FIG. 5. The rear subchassis 18 is constructed similar to the front subchassis 16 and includes upper transverse members 72, right and left vertical members 74 and 76, respectively, and right and left side plates or panels 78 and 80, respectively, whereby the rear subchassis 18 defines a rigid frame-like structure in the rear portion of the chassis and suspension system 10. The rear subchassis 18 is formed so that it is of greater dimension than the adjacent portion of the main chassis 14, whereby the rear subchassis 18 is positionable in outwardly spaced relation to the rear portion of the chassis 14 and relative rotation between the chassis 14 and the subchassis 18 is possible. In this regard, although the drawings illustrate an embodiment of the invention wherein only a small amount of relative rotation between the rear subchassis 18 and the chassis 14 is possible, other embodiments of the instant invention are contemplated wherein substantially greater amounts of relative rotation are possible. The right and left rear wheel connector assemblies 32 and 34 are also preferably of light weight construction and comprise substantially parallel upper A-arms 82 and lower A-arms (not shown) which are of substantially the same dimension as the upper A-arms 82. Rear spring damper assemblies 84 which also may be somewhat "softer" than conventional racing vehicle spring assemblies, are mounted in the rear connecting assemblies 32 and 34 similar to the spring damper assemblies 70 in the front connector assemblies 28 and 30. Rear hub assemblies 86 which are also included in the rear connector assemblies 32 and 34 are pivotally attached to the apices of the pairs of upper and lower rear A-arms and the wheels 24 and 26 are mounted on the hub assemblies 86. Accordingly, the wheels 24 and 26 are resiliently upwardly moveable in substantially zero camber dispositions or in substantially parallel relation to the central vertical axis of the subchassis 18 similar to the wheels 20 and 22 in the front portion of the system 10 as long as the rear subchassis 18 remains in an unrotated disposition. In will be understood that in most applications rear drive components (not shown) will be mechanically connected to one or both of the hub assemblies 86 to drive one or both of the rear wheels 24 and 26 and that such drive components will be adapted to allow the wheels 24 and 26 to freely move upwardly as hereinabove set forth.

The chassis 14 is pivotally suspended adjacent the front and rear ends thereof from the front and rear subchassis 16 and 18, respectively, with the front and rear pivot assemblies 36 and 38, respectively, so that the chassis 14 is pivotable about a substantially longitudinal axis in the chassis and suspension system 10 which is above the longitudinal center of gravity axis of the chassis 14. In this connection, as illustrated most clearly in FIGS. 3-5, the front pivot assembly 36 comprises a pivot rod 88 which is rigidly interconnected to the front assemblies 16 by welding or the like as at 90. The pivot bar 88 is rotatably received in suspension brackets 92 which extend upwardly from the chassis 14 and accordingly the chassis 14 is pivotable about the axis of the rod 88. Also included in the front pivot assembly 36 is an arm 94 which extends downwardly from the rod 88 and is interconnected with a damper 96 mounted within the chassis 14 which dampens the pivotable movement of the chassis 14 relative to the subchassis 16.

The rear pivot assembly 38 comprises a pair of axially aligned pivot rods 98 which are rigidly attached to the rear subchassis 18 and are rotatably received in brackets 100 which extend upwardly from the chassis 14. The rods 98 are preferably axially aligned with the front pivot rod 88 and accordingly the chassis 14 is pivotable about the substantially longitudinal axis in the vehicle which is defined by the axes of the rods 98 and 88. A rear damper which is similar to the damper 96 may be optionally provided in the rear pivot assembly 38 to dampen the pivotable movement of the chassis 17 relative to the rear subchassis 18.

The front and rear interchassis spring assemblies 39 and 40, respectively, resiliently interconnect the front and rear subchassis 16 and 18, respectively, to the chassis 14. Specifically, as illustrated most clearly in FIGS. 3 and 4, the front interchassis spring assembly 39 comprises a leaf spring 102 which is rigidly attached to the front pivot rod 88 and extends outwardly in substantially perpendicular relation therefrom. The outer extremity of the front leaf spring 102 is attached to a connecting rod 104 which extends downwardly along the side of the chassis 14 and is secured thereto as at 106. Accordingly, as the chassis 14 is pivoted about the pivot rod 88, the leaf spring 102 is deformed to resiliently restrict the pivotal movement of the chassis 14 relative to the front subchassis 16. Similarly, the rear spring assembly 40 which is illustrated in FIG. 5 comprises an outwardly extending rear leaf spring 108 which is rigidly attached to one of the rear pivot rods 98, and a downwardly extending connecting rod 110 which is attached to the outer extremity of the spring 108 and to the chassis 14. Accordingly, the rear resilient interconnecting assembly 40 resiliently restricts the pivotal movement of the chassis 14 relative to the rear subchassis 18.

Referring now particularly to FIG. 6, the front portion of the chassis and suspension system 10 is schematically illustrated. By analyzing the forces which act on the system 10 during the cornering thereof, the cooperative relationships between the chassis 14 and the front and rear subchassis 16 and 18, respectively, can be more fully appreciated. For purposes of discussion, however, it can be assumed that the forces acting on the system 10 during cornering are evenly distributed therealong and that, therefore, the forces acting on the front portion of the system 10 can be considered as one half of the overall forces acting thereon. Accordingly, an adequate understanding of the system 10 can be achieved by analyzing the front portion of the system 10 illustrated in FIG. 6.

The schematic illustration in FIG. 6 shows the centrifugal and centripetal forces acting on the front portion of the chassis and suspension system 10 when making a lefthand turn. Since the overall weight of the chassis 14 is normally much greater than the weight of the two subchassis 16 and 18 (usually at least ten times greater), the weight of the two subchassis can be disregarded for purposes of discussion and the weight of the system 10 can be considered as being centered along a hypothetical line indicated at CG representing a longitudinal center of gravity axis of the chassis 14. Accordingly, the resultant centrifugal force applied to the front portion of the system 10 during lefthand cornering can be represented as a transverse force A which is applied to the axis CG and which, for purposes of discussion, can be considered as one half of the total centrifugal force applied to the entire chassis 14. In order to counteract the centrifugal force A, centripetal forces B and C are applied to the wheels 20 and 22, respectively, by the roadway surface therebeneath, the sum of the centripetal forces B and C being equal and opposite to the force A under equilibrium conditions.

By considering the moments of the forces A, B and C, about the axis of the longitudinal pivot rod 88, the relationship of the chassis 14 to the subchassis 16 during cornering can be understood. It will be seen that the forces B and C are transmitted to the front subchassis 16 through the wheels 20 and 22, respectively, and through the respective upper and lower A-arms 50 and 52, respectively, connected thereto. The moments created by the forces B and C about the axis of the pivot rod 88 can be computed from the vertical heights of the A-arms 50 and 52, the vertical heights of the axles 61 (not shown in FIG. 6) and the vertical height of the axis of the rod 88. The moment created by the front portion of the chassis 14 about the axis of the rod 88 can be computed from the force A and the vertical height from the CG axis to the axis of the rod 88. It will be apparent that under any given set of equilibrium conditions, the moments created by forces B and C about the axis of the rod 88 will be equal and opposite to the moment created by the force A about said axis so that the sum of the moments is zero, whereby the rod 88 does not rotate.

While it will be understood that anytime equilibrium conditions exist, the force A will be equal and opposite to the sum of the forces B and C, and that the moment created by the force A about the axis of the rod 88 will be equal and opposite to the sum of the moments created by the forces B and C about the axis of the rod 88, the relative positions of the chassis 14 and the subchassis 16 in the system 10 can differ depending on a number of variables. As illustrated, during left hand cornering, the moments created by the forces B and C tend to make the subchassis 16 rotate in a counterclockwise direction whereas the moment created by the force A tends to make the chassis 14 rotate in a clockwise direction. It should be pointed out that when the chassis 14 is rotated to any significant degree so that the CG axis is not directly beneath the axis of the rod 88, a counter clockwise movement about the axis of the rod 88 is created by the gravitational forces on the chassis 14. However, since it is anticipated that in most cases the chassis and suspension system will be adapted, for instance by adjusting the resiliencies of the interchassis springs 102 and 108, so that the chassis 14 will rotate at most only a few degrees, this moment will normally be insignificant relative to the moment created by the force A and can, therefore, be ignored for purposes of discussion. In any event, by varying certain structural aspects of the chassis and suspension system 10, it is possible to vary the amount of rotation of the subchassis 16 and/or the chassis 14 which takes place under cornering conditions. For example, it will be seen that when the chassis 14 is formed so that the position of the CG axis is raised or lowered, the chassis 14 must be rotated to a correspondingly different degree in order to provide the same vertical height between the CG axis and the axis of the rod 88 to thereby provide the same moment from the force A. Similarly the degree of rotation of the subchassis 16 can be altered by varying the vertical heights of either the upper A-arms 50, the lower A-arms 52, or the axles 61. The degree of relative rotation between the chassis 14 and the subchassis 16 can also be varied by altering the resiliency of the interchassis spring assembly 39. Further, it will be understood that depending on the particular embodiment of the chassis and suspension system of the instant invention, other adjustments thereto which will affect the moments of the forces A, B and C about the axis of the rod 88 may be possible. Accordingly, it is seen that because of the pivotal relationship between the chassis 14 and the subchassis 16, under any given set of cornering conditions the relative positions of the subchassis 16 and the chassis 14 can be controlled to a certain extent by making minor structural changes in the system 10. As a result, by making the proper adjustments to the system 10, it is possible to tune or adjust it so that under cornering conditions only the chassis 14 will rotate and the subchassis 16 will remain in a substantially level or unrotated disposition. When the system 10 is adjusted in this manner, the subchassis 16 will normally remain in a substantially unrotated disposition under all cornering conditions, whereas the degree of rotation of the chassis 14 will vary depending on the magnitude of the centrifugal force A. However, because the subchassis will always remain in a substantially unrotated disposition, the wheels 20 and 22 will be maintained in substantially zero chamber dispositions throughout cornering, so that maximum tire adhesion can be achieved. It should also be pointed out that while obviously an infinite number of different embodiments of the system 10 are possible wherein zero rotation of the front subchassis 16 is achieved, it has been found that it is preferable that the upper A-arms 50 be at approximately the same height as the axis of the pivot rod 88.

The rear portion of the chassis 14 and the rear subchassis 18 can also be tuned or adjusted so that the rear subchassis 18 remains in a substantially unrotated or level disposition under cornering conditions. In this regard, again it is preferable that the rear upper A-arms 82 be disposed at substantially the same height as the height of the axis of the rear pivot rods 98. In any event, when the rear portion of the chassis and suspension system 10 is tuned for zero rotation of the subchassis 18, consideration must also be given to the front portion of this system 10 so that the front and rear portions of the chassis 14 are rotated to substantially the same degree to avoid internal twisting forces in the chassis 14. In most instances the chassis and suspension system 10 will be designed so that when the front and rear subchassis 16 and 18, respectively, have been adjusted for zero rotation, the front and rear portions of the chassis 14 will be adapted for substantially the same degrees of rotation. The most convenient way of effecting such adjustments will normally be by adjusting the resiliencies of either or both of the front and rear interchassis spring assemblies 39 and 40, respectively. However, by utilizing an interchassis spring assembly which is adjustable for varying degrees of resiliency to interconnect the front and/or rear subchassis 16 and 18, respectively, to the chassis 14, final tuning or adjustment of the chassis and suspension system 10 can be effected as needed under testing and/or roadway conditions.

While it is possible to design the system 10 so that the front and/or rear portions thereof are manually adjustable to effect coordination therebetween, it is also possible to provide means which automatically coordinates the front and rear portions of the system 10 to achieve the same degrees of relative rotation between the front and rear subchassis 16 and 18, respectively, and the chassis 14. The alternate embodiment of the chassis and suspension system of the instant invention illustrated in FIG. 7 and generally indicated at 112 is exemplary in this regard. Although all of the components of the system 112 are not fully illustrated in FIG. 7, it will be understood that it is substantially the same as the system 10 but includes an adjustable front interchassis spring assembly 114 instead of the assembly 39, and a linkage assembly 116 which coordinates the movement of the front and rear portions of the system 112. The interchassis spring assembly 114 comprises an adjustable leaf spring 118 which is rotatable to achieve varying degrees of resiliency. The front portion of the linkage assembly 116 comprises a linkage arm 120 which is rigidly attached to the front pivot rod 88 and extends upwardly therefrom, a front bell crank 122 which is rotatably attached to the chassis 14, a front linkage rod 124 which interconnects the arm 120 to the bell crank 122 and a rearwardly extending linkage rod 126 which is also attached to the bell crank 122. Accordingly, the degree of relative rotation between the front portion of the chassis 14 and the front subchassis 16 will determine the degree of rotation of the bell crank 122 and the degree of movement of the linkage rod 126. The rear portion of the linkage assembly 116 comprises a linkage arm 128 which is rigidly attached to the shaft 98 and extends downwardly therefrom, a rear bell crank 130 which is rotatably mounted on the chassis 14, a linkage rod 132 which interconnects the bell crank 130 to the arm 128 and a forwardly extending linkage rod 134. As a result, the degree of rotation between the rear portion of the chassis 14 and the rear subchassis 18 will determine the degree of rotation of the bell crank 130 and the degree of movement of the rod 134. A rotatable member 136 is also provided in the assembly 116 and is connected to the adjustable spring assembly 114 with a rod 138 and a universal 140, whereby the resiliency of the spring 118 can be adjusted by rotating the member 136. The linkage rods 126 and 134 are secured to the lower and upper portions of the member 136, respectively. Accordingly, the dispositions of the front and rear subchassis 16 and 18 relative to the front and rear portions of the chassis 14 are coordinated with each other and adjustments of the spring 118 are automatically effected to either increase or decrease the degree of rotation of the front portion of the chassis 14 so that it matches the degree of rotation of the rear portion thereof.

Another alternate embodiment of the chassis and suspension system of the instant invention is ilustrated in FIG. 8 and generally indicated at 141. The system 141 includes a chassis 14, a front subchassis 142, and a rear subchassis (not shown), the chassis 14 being pivotably suspended from the front subchassis 142 and the rear subchassis and being pivotable about an axis 143. Front connecting assemblies 144 in the system 141 interconnected front wheels 20 and 22 to the front subchassis 142 so that they are resiliently upwardly movable in substantially zero camber dispositions as long as the subchassis 142 is in an unrotated disposition. Specifically, the connecting assemblies 144 include outer arms 144a which are rigidly attached to king pins (not shown), and substantially parallel upper and lower connecting arms 144b and 144c which are pivotally attached to the subchassis 142 and to the outer arms 144a. Hence, the outer arms 144a and the connecting arms 144b and 144c cooperate to define substantially parallel linkage assemblies on the opposite sides of the front subchassis 142 for maintaining the wheels 20 and 22 in upwardly movable relation and in substantially zero camber dispositions as long as the front subchassis 142 is in an unrotated disposition. The remainder of the system 141, which is not shown in the drawings, is substantially the same as the system 10. The basic operation of the system 141 is the same as the system 10, the main differences between the two systems being in the configurations of the front subchassis 16 and 142 and the configuration of the connecting assemblies 28 and 30 and the assemblies 144. Accordingly, it will be understood that the system 141 can also be tuned for substantially zero rotation of the front subchassis 142 and the rear subchassis (not shown) thereof to maintain the wheels 20, 22, 24 and 26 thereof in substantially zero camber dispositions.

Figure 1:
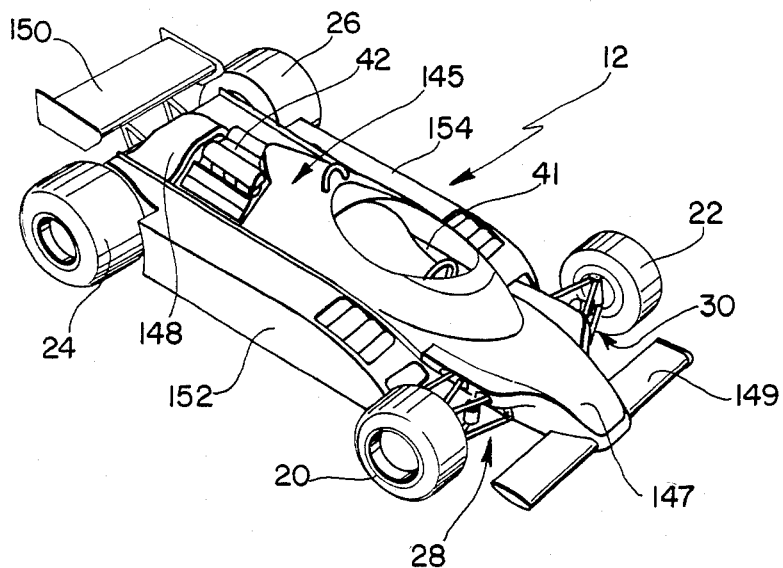
FIG. 1 is a perspective view of a vehicle embodying the chassis and suspension system of the instant invention.
Figure 2:
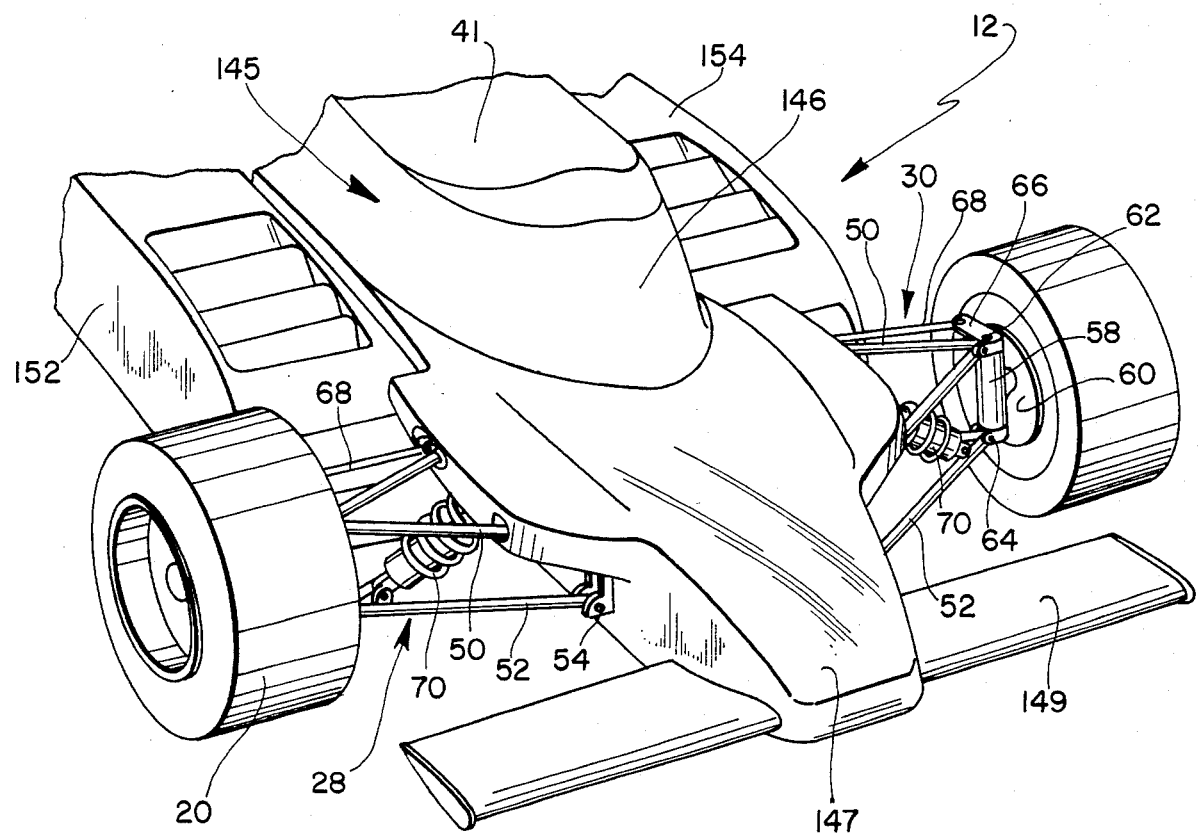
FIG. 2 is an enlarged fragmentary perspective view of the front end portion thereof.

The chassis and suspension system of the instant invention is suitable for use in a variety of types of vehicles. As herein embodied, however, the chassis and suspension system 10 is adapted for use in a high speed vehicle of the type illustrated most clearly in FIGS. 1 and 2, and generally indicated at 12. The vehicle 12 comprises a body section 145 having a cockpit housing portion 146, a nose section 147 and an engine housing portion 148. Included in the body section 145 are front and rear spoilers 149 and 150, respectively, which provide increased downward pressure on the wheels 20, 22, 24 and 26 for improved roadway adhesion. Also included in the vehicle 12 are right and left venturi ducts 152 and 154, respectively, which are mounted on the right and left sides, respectively, of the front and rear subchassis 16 and 18, respectively. In this regard, as illustrated in FIGS. 1, 2 and 10, the venturi ducts 152 and 154 are disposed in outwardly spaced relation to the body 145 to permit rotation of the body 145, which is mounted on the chassis 14, relative to the venturi ducts 152 and 154, which are mounted on the subchassis 16 and 18. Referring to FIG. 10 wherein the rear connecting assemblies 32 and 34 are schematically illustrated, it will be seen that venturi brackets 156 extend outwardly from the rear subchassis 18 and the ducts 152 and 154, which include mounting portions 158 and 160, respectively, are mounted on the brackets 156 with rubberized cushions 162. The ducts 152 and 154 further include venturi portions 164 and 166, respectively, which extend downwardly beneath the brackets 156 to define air conduits adjacent the roadway surface of the vehicle 12. Accordingly, the venturi ducts 152 and 154 also function to draw the vehicle 12 downwardly to provide increased downward pressure on the wheels 20, 22, 24 and 26 for increased roadway adhesion, However, while the concept of providing venturi ducts on a high speed vehicle is well known in the art, the instant invention provides a significant improvement in this area. Specifically, by providing venturi ducts 152 and 154 which are mounted on the nonrotating subchassis 16 and 18 of the vehicle 12, substantially improved operation of the venturi ducts 152 and 154 can be achieved. In this regard, since the subchassis 16 and 18 do not normally rotate even during cornering of the vehicle 12, the venturi portions 164 and 166 of the ducts 152 and 154, respectively, can extend downwardly further and be maintained in more closely spaced relation to a roadway surface without engaging same. As a result, they provide improved venturi action for improved tire adhesion.

It is seen, therefore, that the instant invention provides a unique chassis and suspension system wherein the wheels of a vehicle may be maintained in substantially zero camber dispositions to maintain maximum tire contact patch area. By properly tuning the chassis and suspension system 10 as hereinabove set forth, when it is subjected to cornering forces, only the chassis 14 rotates and the subchassis 16 and 18 remain in substantially unrotated dispositions. In fact, when the system 10 is tuned properly in this manner, the subchassis 16 and 18 remain in substantially unrotated dispositions even during acceleration or braking under cornering conditions. Consequently, the wheels 20, 22, 24 and 26 remain perpendicular to the roadway surface therebeneath throughout cornering even when accelerating or braking during cornering and improved roadway adhesion is, therefore, achieved under virtually all cornering conditions. Further, because the front and rear subchassis 16 and 18 do not rotate, the venturi ducts 152 and 154 can be maintained in substantially level dispositions during cornering and, therefore, they can be maintained in closely spaced relation to a roadway surface without engaging same. The chassis and suspension system can also be embodied in light "unsprung weight" designs to reduce the effects of bumps and can be constructed with substantially softer springs than conventional racing-type vehicles to reduce driver fatigue. Consequently, for all of these reasons as well as the other reasons hereinabove set forth, it is seen that the chassis and suspension system of the instant invention represents a significant advancement in the art which has substantial merit, particularly for high speed vehicle applications.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A chassis and suspension system for a vehicle and the like comprising:
    (a) a chassis;
    (b) a front subchassis;
    (c) a rear subchassis;
    (d) right and left front wheels;
    (e) right and left rear wheels;
    (f) front wheel connecting means rotatably mounting said front wheels on the right and left sides of said front subchassis, respectively, for supporting said front subchassis on a supporting surface, said front wheels being pivotable to effect steering of said vehicle and being independently resiliently upwardly movable relative to said front subchassis;
    (g) rear wheel connecting means rotatably mounting said rear wheels on the right and left sides of said rear subchassis, respectively, for supporting said rear subchassis on a supporting surface, said rear wheels being independently resiliently upwardly movable relative to said rear subchassis;
    (h) pivot means pivotally suspending the front and rear portions of said chassis, from said front and rear subchassis, respectively, so that said chassis is pivotable about a substantially longitudinal axis in said vehicle which is above the longitudinal center-of-gravity axis of said chassis;
    (i) means interconnecting said chassis to said front subchassis to resiliently restrict the pivotal movement of said front subchassis relative to said chassis, said chassis to front subchassis interconnecting means being independent of and unconnected to said front wheel connecting means; and
    (j) means interconnecting said chassis to said rear subchassis to resiliently restrict the pivotal movement of said rear subchassis relative to said chassis, said chassis to rear subchassis interconnecting means being independent of and unconnected to said rear wheel connecting means.

2. In the chassis and suspension system of claim 1, said front and rear resilient interconnecting means further characterized as independently, resiliently interconnecting the front and rear portions of said chassis, respectively, to said front and rear subchassis, respectively, to independently resiliently restrict the pivotal movement of said front subchassis and said rear subchassis relative to said chassis.

3. In the chassis and suspension system of claim 2, said front and rear subchassis, said front and rear wheel connecting means, said front and rear resilient interconnecting means and said chassis being dimensioned so that when said vehicle is advanced in an arcuate path on a supporting surface, said chassis rotates relative thereto and relative to said front and rear subchassis, whereas said front and rear subchassis remain in substantially unrotated dispositions relative to said supporting surface.

4. In the chassis and suspension system of claim 2, said front wheel connecting means further characterized as mounting said front wheels so that they are independently upwardly movable in substantially parallel relation to the central vertical axis of said front subchassis.

5. In the chassis and suspension system of claim 2, said rear wheel connecting means further characterized as mounting said rear wheels so that they are independently upwardly movable in substantially parallel relation to the central vertical axis of said rear subchassis.

6. In the chassis and suspension system of claim 4, said rear wheel connecting means further characterized as mounting said rear wheels so that they are upwardly movable in substantially parallel relation to the central vertical axis of said rear subchassis.

7. In the chassis and suspension system of claim 3, said front wheel connecting means further characterized as mounting said front wheels so that they are independently upwardly movable in substantially parallel relation to the central vertical axis of said front subchassis, said rear wheel connecting means further characterized as mounting said rear wheels so that they are independently upwardly movable in substantially parallel relation to the central vertical axis of said rear subchassis.

8. In the chassis and suspension system of claim 7, said front wheel connecting means comprising:
    (a) right and left pairs of vertically spaced upper and lower front A-arms pivotally attached at the bases thereof to the right and left sides of said front subchassis, respectively; and
    (b) right and left front wheel mounting means attached to the apices of the respective pairs of A-arms, said front wheel mounting means rotatably mounting the respective front wheels on the respective A-arms so that they are upwardly movable in substantially parallel relation to the central vertical axis of said front subchassis and so that they are pivotable to effect steering of said vehicle.

9. In the chassis and suspension system of claim 8, said right and left front wheel mounting means further characterized as right and left front king pins, respectively.

10. In the chassis and suspension system of claim 8, said rear wheel connecting means comprising:
    (a) right and left pairs of spaced upper and lower rear A-arms pivotally attached at the bases thereof to the right and left sides of said rear subchassis; and
    (b) right and left rear wheel mounting means attached to the apices of the respective pairs of A-arms rotatably mounting the respective wheels on the respective A-arms so that they are upwardly movable in substantially parallel relation to the central vertical axis of said rear subchassis.

11. The chassis and suspension system of claim 3, further comprising right and left venturi ducts mounted on the right and left sides, respectively, of said front and rear subchassis.

12. In the chassis and suspension system of claim 2, one of said front and rear resilient interconnecting means further characterized as being of adjustable resiliencey.

13. The chassis and suspension system of claim 12, further comprising means interconnected to said chassis, said front and rear subchassis, and to said front and rear resilient interconnecting means for automatically adjusting one of said resilient interconnecting means to achieve the same degree of relative rotation between the front portion of said chassis and said front subchassis as between the rear portion of said chassis and said rear subchassis.

14. In the chassis and suspension system of claim 3, said right and left upper front A-arms being connected to said front subchassis at points which are at substantially the same height as the axis of said front pivot means, said right and left upper rear A-arms being connected to said rear subchassis at points which are at substantially the same height as the axis of said rear pivot means.

15. The chassis suspension system of claim 1, further comprising means dampening the pivotal movement of said chassis relative to said front subchassis.

16. The chassis and suspension system of claim 1, further comprising means dampening the pivotal movement of said chassis relative to said front subchassis and also relative to said rear subchassis.

* * * * *